United States Patent

Koenig et al.

[15] 3,679,678
[45] July 25, 1972

[54] DIAMINO-S-TRIAZINES

[72] Inventors: Karl-Heinz Koenig; Artur Maschke, both of Ludwigshafen; Adolf Fischer, Mutterstadt, all of Germany

[73] Assignee: Badische Anilin-& Soda-Fabrik Aktiengesellschaft, Ludwighsafen/Rhein, Germany

[22] Filed: Nov. 21, 1968

[21] Appl. No.: 777,873

[52] U.S. Cl. ............................. 260/249.8, 71/93, 260/249.9
[51] Int. Cl. ........................................................ C07d 55/20
[58] Field of Search .................................. 260/249.8; 71/93

[56] References Cited

UNITED STATES PATENTS

| 3,185,561 | 5/1965 | Acker | 260/249.8 X |
| 3,235,359 | 2/1966 | Acker | 260/249.8 X |
| 3,261,835 | 7/1966 | Hamm et al. | 260/249.8 |
| 3,267,099 | 8/1966 | Acker | 260/249.8 |
| 3,303,015 | 2/1967 | Speziale et al. | 260/249.8 X |
| 3,306,725 | 2/1967 | Knusli et al. | 260/249.8 X |
| 3,347,657 | 10/1967 | Knusli et al. | 260/249.8 X |

*Primary Examiner*—John M. Ford
*Attorney*—Marzall, Johnston, Cook & Root

[57] ABSTRACT

Valuable new triazine derivatives having good herbicidal properties, especially for controlling unwanted plants without damaging crop plants.

3 Claims, No Drawings

DIAMINO-S-TRIAZINES

The present invention relates to valuable new triazine derivatives which have a strong herbicidal action and a process for controlling unwanted plants without damaging crop plants with these triazine derivatives.

It is known to use 2,4,6-substituted triazines, especially 2-chloro-4,6-bis-(ethylamino)-s-triazine, as herbicidal active ingredients; however, their action is unsatisfactory.

An object of the invention is valuable new triazine derivatives. A further object of the invention is valuable new triazine derivatives containing an alkyl radical substituted by oxygen or sulfur. Yet another object of the invention is a process for controlling unwanted plants with valuable new triazine derivatives without damaging crop plants.

These and other objects of the invention are achieved by triazine derivatives having the general formula

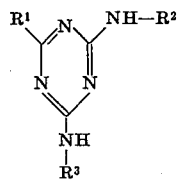

in which $R^1$ denotes a chlorine or bromine atom or a cyano, methoxy or thiomethyl group. $R^2$ denotes a lower aliphatic or alkoxyalkyl radical having not more than six carbon atoms or a lower alkylthioalkyl radical and $R^3$ denotes a lower alkylthioalkyl radical or a lower alkoxyalkyl radical or a chlorine atom. These substituted triazines have not previously been described in the literature.

The compounds may be prepared stepwise — at different temperatures — for example by reaction of cyanuric chloride or cyanuric bromide with the corresponding amines in the presence of agents which bind hydrogen halides. If desired, the third halogen atom in the triazine may be exchanged, for example by reaction with sodium methylate, sodium methylmercaptide or sodium cyanide.

90 parts by weight of ethylamine is dripped, at a temperature of −10° to −20° C, into a solution of 189 parts by weight of cyanuric chloride in 600 parts by weight of acetone. The reaction mixture is then stirred for one hour at −10° to −20° C, the precipitated ethylamine hydrochloride is suction filtered and the filtrate is freed from solvent in vacuo. The crystalline residue is recrystallized from cyclohexane. 189 parts by weight of 2,4-dichloro-6-ethylamino-1,3,5-triazine is obtained, boiling point 103° to 105° C.

From two dropping funnels 13.2 parts by weight of α-methyl-β-methoxyethylamine and a solution of 6 parts by weight of sodium hydroxide in 20 parts by weight of water are simultaneously added, at a temperature of 20° to 30° C, to a solution of 29 parts by weight of 2,4-dichloro-6-ethylamino-1,3,5-triazine in 200 parts by weight of acetone. The whole is then stirred for a fairly long time at room temperature (20° C), the reaction mixture is filtered and the filtrate freed from solvent in vacuo. The crystalline residue is recrystallized from cyclohexane. 24 parts by weight of 2-chloro-4-ethylamino-6-(α-methyl-β-methoxyethyl)-amino-1,3,5-triazine, boiling point 96° C, is obtained.

Some of the active ingredients according to the invention are listed below:

2-chloro-4-isopropylamino-6-(α-methyl-β-methoxyethyl)-amino-1,3,5-triazine, b.p. 124° to 125° C;

2-thiomethyl-4-ethylamino-6-(β-methylthioethyl)-amino-1,3,5-triazine, b.p. 109° to 110° C.

2-(α-methyl-β-methoxyethyl)-amino-4-(α-methoxypropyl)-amino-6-chloro-s-triazine, b.p. 76° to 78° C;

2-(α-methyl-β-methoxyethyl)-amino-4-(α-methoxypropyl)-amino-6-methoxy-s-triazine, b.p. (0.05 mmHg) 186° to 189° C;

2-(α-methyl-β-methoxyethyl)-amino-4-ethylamino-6-thiomethyl-s-tri-azine, b.p. (0.1 mmHg) 162° C;

2-(α-methyl-β-methoxyethyl)-amino-4-(α-methoxypropyl)-amino-6-thio-methyl-s-triazine, b.p. (0.08 mmHg) 191° to 193° C;

2,4-bis-(α-methyl-β-methoxyethyl)-amino-6-methoxy-s-triazine, b.p. (0.1 mmHg) 181° to 184° C;

2,4-bis-(α-methyl-β-methoxyethyl)-amino-6-chloro-s-triazine, b.p. (0.01 mmHg) 178° to 180° C;

2,4-bis-(α-methyl-β-methoxyethyl)-amino-6-thiomethyl-s-triazine, b.p. (0.5 mmHg) 197° to 201° C;

2-(α-methyl-β-methoxyethyl)-amino-4-ethylamino-6-methoxy-s-triazine; b.p. (0.4 mmHg) 168° to 170° C;

2-(α-methyl-β-methoxyethyl)-amino-4-methylamino-6-thiomethyl-s-tri-azine, b.p. (0.2 mmHg) 173° to 175° C;

2-(α-methyl-β-methoxyethyl)-amino-4-isopropylamino-6-methoxy-s-tri-azine, b.p. (0.2 mmHg) 148° to 150° C;

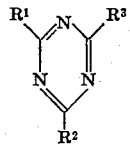

| $R^1$ | $R^2$ | $R^3$ | B.P., °C. B.P. (mm. Hg) |
|---|---|---|---|
| Cl | —NH—CH(CH₃)(CH₂—O—C₂H₅) | NH—CH₂—CH₂—S—CH₃ | 65–67 |
| Cl | NH—C₂H₅ | NH—CH(CH₃)(CH₂—O—C₂H₅) | 67–68 |
| Cl | NH—CH(CH₃)(CH₂—O—C₂H₅) | NH—CH(CH₃)(CH₂—O—C₂H₅) | -------------- |
| Cl | NH—CH₃ | NH—CH(CH₃)(CH₂—O—C₂H₅) | 97–98 |
| Cl | NH—CH(CH₃)(CH₂—O—C₂H₅) | NH—CH₂—CH₂—CH₂—O—CH₃ | -------------- |
| Cl | NH—CH(CH₃)(CH₃) | NH—CH(CH₃)(CH₂—O—C₃H₇) | 88–89 |

| R¹ | R² | R³ | B.P., °C. B.P. (mm. Hg) |
|---|---|---|---|
| Cl | NH—C₂H₅ | NH—CH(CH₃)(CH₂—O—C₃H₇) | 63–66 |
| CH₃—S— | NH—CH₃ | NH—CH(CH₃)(CH₂—O—C₂H₅) | 162–66° C. (0.2 mm. Hg). |
| CH₃—S— | NH—CH(CH₃)(CH₂—O—C₂H₅) | NH—CH(CH₃)(CH₂—O—C₂H₅) | 186–87° C. (0.2 mm. Hg). |
| Cl | NH—CH(CH₃)(CH₂—O—CH₃) | NH—CH₂—CH₂—S—C₂H₅ | 64–66 |
| CH₃—O— | NH—C₂H₅ | NH—CH(CH₃)(CH₂—O—C₃H₇) | 158–61° C. (0.1 mm. Hg). |
| CH₃—O— | NH—CH(CH₃)(CH₃) | NH—CH(CH₃)(CH₂—O—C₃H₇) | 178–84° C. (1.3 mm. Hg). |
| CH₃—S— | NH—C₂H₅ | NH—CH(CH₃)(CH₂—O—C₃H₇) | 182–84° C. (0.4 mm. Hg). |
| CH₃—S— | NH—CH(CH₃)(CH₃) | NH—CH(CH₃)(CH₂—O—C₃H₇) | 175–76° C. (0.4 mm. Hg). |
| Cl | NH—CH₂—CH₂—S—CH₃ | NH—CH₂—CH₂—S—CH₃ | 200–201 |
| Cl | NH—CH₂—CH₂—S—C₂H₅ | NH—CH(CH₃)(CH₂—O—C₃H₇) | 38–39 |
| Cl | NH—C₂H₅ | NH—CH₂—CH₂—S—CH₃ | 175–176 |
| Cl | NH—CH₂—CH₂—S—C₂H₅ | NH—CH₂—CH₂—S—C₂H₅ | 194–195 |
| Cl | NH—CH₂—CH₂—S—C₂H₅ | NH—C₂H₅ | 173–174 |
| Cl | NH—C₂H₅ | NH—CH₂(CH₃)(CH₂—S—C₂H₅) | 108–109 |
| Cl | NH—CH₃ | NH—CH(CH₃)(CH₂—S—C₂H₅) | 120–121 |
| Cl | NH—CH(CH₃)(CH₃) | NH—CH(CH₃)(CH₂—S—C₂H₅) | 88–89 |
| Cl | NH—C₂H₅ | NH—CH(CH₃)(CH₂—S—CH₃) | 120–123 |
| CH₃—S— | NH—C₂H₅ | NH—CH₂—CH₂—S—CH₃ | 218°–220° C. (1.8 mm. Hg). |
| Cl | NH—CH₃ | NH—CH(CH₃)(CH₂—S—C₂H₅) | 120–121 |
| Cl | NH—CH(CH₃)(CH₂) | NH—CH(CH₃)(CH₂—S—CH₃) | .............. |
| Cl | NH—CH₂—CH₂—CH₂—O—CH₃ | Cl | 74–76 |
| Cl | NH—CH(CH₃)(CH₂—O—CH₃) | Cl | 89–91 |
| Cl | NH—CH₂—CH₂—CH₂—O—CH₃ | NH—CH(CH₃)(CH₂—S—C₂H₅) | 59–62 |

| R¹ | R² | R³ | B.P., °C. | B.P. (mm. Hg) |
|---|---|---|---|---|
| Cl | NH—CH$_2$—CH$_2$—CH$_2$—O—CH$_3$ | NH—CH(CH$_3$)(CH$_2$—S—CH$_3$) | 66–71 | |
| Cl | NH—CH$_2$—CH$_2$—CH$_2$—O—CH$_3$ | NH—CH(CH$_3$)(CH$_2$—O—C$_2$H$_5$) | | |
| CH$_3$—S | NH—CH(RH$_3$)(CH$_2$—O—CH$_3$) | NH—CH$_2$—CH$_2$—CH$_2$—O—CH$_3$ | 202–203° C. (0.2 mm. Hg). | |
| CH$_3$—S— | NH—CH$_2$—CH$_2$—S—C$_2$H$_5$ | NH—CH$_2$—CH$_2$—S—C$_2$H$_5$ | 245–47° C. (0.2 mm. Hg). | |

Further active ingredients are named in the Examples.

As herbicides, the new compounds may be applied as solutions, emulsions, suspensions or dusts. The form of application depends entirely on the purpose for which the compounds are being used; in any case, it should ensure a fine distribution of the active ingredient.

For the preparation of solutions to be sprayed direct, mineral oil fractions having medium to high boiling points, such as kerosene or diesel oil, coal-tar oils and oils of vegetable or mineral origin, and also cyclic hydrocarbons such as tetrahydronaphthalene and alkylated naphthalenes are suitable.

Aqueous formulations may be prepared from emulsion concentrates, pastes or wettable powders by adding water. To prepare emulsions, the ingredients as such or dissolved in a solvent may be homogenized in water by means of wetting or dispersing agents (e.g. polyethylene oxide adducts). Concentrates which are suitable for dilution with water may be prepared from active ingredient, emulsifying or dispersing agent and possibly solvent.

Dusts may be prepared by mixing or grinding the active ingredients with a solid carrier, e. g. clay, diatomite or fertilizers.

The following Examples demonstrate the superiority of the compositions according to this invention over known active ingredients.

EXAMPLE 1

Plastic pots having a diameter of 8 cm are filled with loamy sandy soil in a greenhouse and sown with seeds of barley (Hordeum vulgare), wheat (Triticum sativum), Indian corn (Zea mays), annual meadow grass (Poa annua), slender foxtail (Alopecurus myosuroides), small nettle (Urtica urens), wild mustard (Sinapis arvensis), white goosefoot (Chenopodium album), vetch (Vicia sp.), chamomile (Matricaria chamomilla) and chickweed (Stellaria media); the soil prepared in this manner is then treated with 1.5 kg per hectare of 2-chloro-4-ethylamino-6-(α-methyl-β-methoxyethyl)-amino-1,3,5-triazine (I) and, for comparison, with 1.5 kg per hectare of 2-chloro-4,6-bis-(ethyl-amino)-s-triazine (II), these amounts of the active ingredients each being dispersed in 500 liters of water. After four to five weeks I shows superior compatibility with barley (Hordeum vulgare) and wheat (Triticum sativum) and also exhibits a stronger herbicidal action on weeds.

The results of the experiment may be seen from the following table:

| | Active ingredient | |
|---|---|---|
| | I | II |
| barley | 10 | 20–30 |
| wheat | 10 | 20 |
| Indian corn | 0–10 | 0–10 |
| annual meadow grass | 90 | 80 |
| slender foxtail | 80 | 70 |
| small nettle | 100 | 90–100 |
| wild mustard | 100 | 90 |
| white goosefoot | 90–100 | 80–90 |
| vetch | 90–100 | 80 |
| chamomile | 90 | 80–90 |
| chickweed | 90–100 | 80–90 |

0 = no damage
100 = total destruction

EXAMPLE 2

In a greenhouse the plants barley (Hordeum vulgare), wheat (Triticum sativum), Indian corn (Zea mays), wild mustard (Sinapis arvensis), small nettle (Urtica urnes), white goosefoot (Chenopodium Album), chamomile (Matricaria chamomilla), chickweed (Stellaria media), annual meadow grass (Poa annua) and slender foxtail (Alopecurus myosuroides) are treated at a growth height of from 3 to 17 cm with 1.5 kg per hectare of the active ingredient 2-chloro-4-ethylamino-6-(α-methyl-β-methoxyethyl)-amino-1,3,5-triazine (I) and, for comparison, with 1.5 kg per hectare of the active ingredient 2-chloro-4,6-bis-(ethylamino)-s-triazine (II), each amount of the active ingredients being dispersed in 500 liters of water. After three weeks it is ascertained that I shows superior compatibility with barley (Hordeum vulgare) and wheat (Triticum sativum) and also exhibits a stronger herbicidal effect on weeds.

The results of the experiment may be seen from the following table:

| | Active ingredient | |
|---|---|---|
| | I | II |
| barley | 0–10 | 20–30 |
| wheat | 10 | 20–30 |
| Indian corn | 0 | 0–10 |
| wild mustard | 100 | 90–100 |
| small nettle | 90–100 | 90–100 |
| white goosefoot | 90–100 | 90–100 |
| chamomile | 90 | 80–90 |
| chickweed | 90–100 | 90 |
| annual meadow grass | 90–100 | 90 |
| slender foxtail | 90 | 80 |

0 = no damage
100 = total destruction

EXAMPLE 3

In a greenhouse, seeds of wild mustard (Sinapis arvensis), small nettle (Urtica urens), white goosefoot (Chenopodium album), chamomile (Matricaria chamomilla), chickweed (Stellaria media), annual meadow grass (Poa annua) and slender foxtail (Alopecurus myosuroides) are sown in loamy sandy soil; the soil prepared in this manner is then treated with 5kg per hectare of 2-chloro-4-ethylamino-6-(α-methyl-β-methoxyethyl)-amino-1,3,5-triazine (I) and, for comparison, with 5kg per hectare of 2-chloro-4,6-bis-(ethylamino)-1,3,5-triazine (II), each amount of the active ingredients being dispersed in 500 liters of water per hectare. After four to five weeks it is ascertained that I has a stronger herbicidal action than II.

EXAMPLE 4

The plants wild mustard (Sinapis arvensis), small nettle (Urtica urens), white goosefoot (Chenopodium album), chamomile (Matricaria chamomilla), chickweed (Stellaria media), annual meadow grass (Poa annua) and slender foxtail (Alopecurus myosuroides), growing on an experimental area, are treated at a growth height of 3 to 12 cm with 5kg per hectare of 2-chloro-4-ethylamino-6-(α-methyl-β-methoxyethyl)-amino-1,3,5-triazine (I) and, for comparison, with 5kg per hectare of 2-chloro-4,6-bis-(ethylamino)-1,3,5-triazine (II), these amounts of the active ingredients each being dispersed in 500 liters of water per hectare. After one to two weeks it is ascertained that I acts more quickly on the above-mentioned weeds and weed grasses than II, and after four to eight weeks all the plants are almost completely withered.

The following substances have the same biological action as I in Examples 1,2,3 and 4:
- 2-chloro-4-isopropylamino-6-(α-methyl-β-methoxyethyl)-amino-1,3,5-triazine,
- 2-thiomethyl-4-isopropylamino-6-(α-methyl-β-methoxyethyl)-amino-1,3,5-triazine,
- 2-methoxy-4-isopropylamino-6-(α-methyl-β-methoxyethyl)-amino-1,3,5-triazine,
- 2-chloro-4-tertiary-butylamino-6-(α-methyl-β-methoxyethyl)-amino-1,3,5-triazine,
- 2-chloro-4,6-bis-(α-methyl-β-methoxyethyl)-amino-1,3,5-triazine,
- 2-chloro-4-methylamino-6-(α-methyl-β-methoxyethyl)-amino-1,3,5-tri-azine,
- 2-bromo-4-ethylamino-6-(α-methyl-β-methoxyethyl)-amino-1,3,5-tri-azine,
- 2-cyano-4-ethylamino-6-(α-methyl-β-methoxyethyl)-amino-1,3,5-triazine,
- 2-chloro-4-methoxyethylamino-6-(α-methyl-β-methoxyethyl)-amino-1,3,5-triazine,
- 2-chloro-4-γ-methoxypropylamino-6-(α-methyl-β-methoxyethyl)-amino-1,3,5-triazine,
- 2-methoxy-4-ethylamino-6-(α-methyl-β-methoxyethyl)-amino-1,3,5-triazine,
- 2-thiomethyl-4-ethylamino-6-(α-methyl-β-methoxyethyl)-amino-1,3,5-triazine.

EXAMPLE 5

PLastic pots having a diameter of 8 cm are filled with loamy sandy soil in a greenhouse and then sown with seeds of barley (Hordeum vulgare), wheat (Triticum sativum), annual meadow grass (Poa annua), white goosefoot (Chenopodium album), wild mustard (Sinapis arvensis), small nettle (Urtica urens), chickweed (Stellaria media) and chamomile (Matricaria chamomilla) and treated the same day with 2 kg per hectare of 2-thiomethyl-4-ethylamino-6-(β-methylthioethyl)-amino-1,3,5-triazine (I) and, for comparison, with 2 kg per hectare of 2-chloro-4,6-bis-(ethylamino)-1,3,5-triazine (II), these amounts of the active ingredients each being dispersed in 500 liters of water. After four to five weeks it is ascertained that the broadleaved and grassy weeds are almost completely withered but that I, in comparison to II, has superior compatibility with the crop plants wheat (Triticum sativum) and barley (Hordeum vulgare).

EXAMPLE 6

In a greenhouse the plants barley (Hordeum vulgare), wheat (Triticum sativum), Indian corn (Zea mays), annual meadow grass (Poa annua), slender foxtail (Alopecurus myosuroides), wild mustard (Sinapis arvensis), white goosefoot Chenopodium album), small nettle (Urtica urens), chickweed (Stellaria media) and chamomile(Matricaria chamomilla) are treated at a growth height of three to 18 cm with 1.5kg per hectare of 2-thiomethyl-4-ethylamino-6-(β-methylthioethyl)-amino-1,3,5-triazine (I) and, for comparison, with 1.5kg per hectare of 2-chloro-4,6-bis-(ethylamino)-1,3,5-triazine (II), these amounts of the active ingredients being dispersed in 500 liters of water.

After three weeks it is ascertained that I causes less damage to barley (Hordeum vulgare) and wheat (Triticum sativum) than II, and also has a stronger herbicidal action on weeds.

The herbicidal action may be seen from the following table:

|  | Active ingredient I | II |
|---|---|---|
| barley | 0–10 | 20–30 |
| wheat | 10 | 20–30 |
| Indian corn | 0–10 | 0–10 |
| annual meadow grass | 90–100 | 90 |
| slender foxtail | 90 | 80 |
| wild mustard | 100 | 90–100 |
| white goosefoot | 100 | 90–100 |
| small nettle | 90–100 | 90–100 |
| chickweed | 90–100 | 90 |
| chamomile | 90–100 | 80–90 |

0 = no damage, 100 = total destruction

EXAMPLE 7

An experimental area is sown with annual meadow grass (Poa annua), slender foxtail (Alopecurus myosuroides), wild mustard (Sinapis arvensis), white goosefoot (Chenopodium album), small nettle (Urtica urens), chickweed (Stellaria media) and chamomile (Matricaria chamomilla) and sprayed the same day with 5kg per hectare of 2-thiomethyl-4-ethylamino-6-(β-methylthioethyl)-amino-1,3,5-triazine, dispersed in 500 liters of water per hectare. After four to five weeks it is ascertained that all the plants are withered.

EXAMPLE 8

The plants annual meadow grass (Poa annua), slender foxtail (Alopecurus myosuroides), wild mustard (Sinapis arvensis), white goosefoot (Chenopodium album), small nettle (Urtica urens), chickweed (Stellaria media) and chamomile (Matricaria chamomilla), growing on experimental area, are sprayed at a growth height of 3 to 18 cm with 5kg per hectare of 2-thiomethyl-4-ethylamino-6-(β-methylthio-ethyl)-amino-1,3,5-triazine (I), and, for comparison, with 5 kg per hectare of 2-chloro-4,6-bis-(ethylamino)-1,3,5-triazine (II), these amounts of the active ingredients each being dispersed in 500 liters of water per hectare. After eight to 10 days it is ascertained that more damage has been caused to the broadleaved and grassy weeds treated with I than to those plants treated with II. After three to four weeks almost all the plants are completely withered.

The following substances have the same biological action as I in Examples 5,6,7 and 8:
- 2-thiomethyl-4-isopropylamino-6-(β-methylthioethyl)-amino-1,3,5-triazine,
- 2-chloro-4-ethylamino-6-(β-methylthioethyl)-amino-1,3,5-triazine,
- 2-chloro-4-isopropylamino-6-(β-methylthioethyl)-amino-1,3,5-triazine,
- 2-cyano-4-isopropylamino-6-(β-methylthioethyl)-amino-1,3,5-triazine,
- 2-chloro-4-methylamino-6-(β-methylthioethyl)-amino-1,3,5-triazine.

EXAMPLE 9

Loamy sandy soil is filled into pots and sown with seeds of Indian corn (Zea mays), barley (Hordeum vulgare), wheat (Triticum sativum), annual meadow grass (Poa annua), slender foxtail (Alopecurus myosuroides), white goosefoot (Chenopodium album), small nettle (Urtica urens), wild mustard (Sinapis arvensis), vetch (Vicia sp.), chamomile (Matricaria chamomilla) and chickweed (Stellaria media); the soil is then treated with 1.5kg per hectare of 2-ethylamino-4-propoxyisopropylamino-6-chloro-s-triazine (I), 1.5kg per hectare of 2-isopropylamino-4-propoxyisopropylamino-6-chloro-s-triazine (II), 1.5kg per hectare of 2-isopropylamino-4-propoxyiso-propylamino-6-methoxy-s-triazine (III), 1.5kg per hectare of 2-ethylamino-4-propoxyisopropylamino-6-methoxy-s-triazine (IV), 1.5kg per hectare of 2,4-bis-(ethoxyisopropylamino)-6-methylmercapto-s-triazine (V) and 1.5kg per hectare of 2-ethylamino-4-ethylmercapto-isopropylamino-6-chloro-s-triazine (VI), these amounts of the active ingredients each being dispersed in 500 liters of water per hectare. The results of the experiment after four to five weeks may be seen from the following table:

|  | Active ingredient | | | | | |
|---|---|---|---|---|---|---|
|  | I | II | III | IV | V | VI |
| Indian corn | 0–10 | 0–10 | 0 | 0 | 0–10 | 0–10 |
| barley | 10 | 0–10 | 0–10 | 0–10 | 0–10 | 0–10 |
| wheat | 10 | 0–10 | 0–10 | 10 | 0–10 | 0–10 |
| annual meadow grass | 80–90 | 80 | 80 | 80 | 80 | 80 |

| | | | | | |
|---|---|---|---|---|---|
| slender foxtail | 80 | 80 | 80 | 70–80 | 70–80 | 70–80 |
| small nettle | 90–100 | 90–100 | 90–100 | 90–100 | 90–100 | 90–100 |
| wild mustard | 100 | 90–100 | 90–100 | 90–100 | 90 | 90 |
| white goosefoot | 90–100 | 90–100 | 90–100 | 90 | 90 | 90 |
| vetch | 90 | 80–90 | 80 | 80 | 80 | 80 |
| chamomile | 90 | 80–90 | 80–90 | 80 | 80 | 80 |
| chickweed | 100 | 90–100 | 90 | 90 | 80–90 | 90 |

0 = no damage
100 = total destruction

EXAMPLE 10

In a greenhouse the plants barley (Hordeum vulgare), wheat (Triticum sativum), Indian corn (Zea mays), small nettle (Urtica urens), white goosefoot (Chenopodium album), chamomile (Matricaria chamomilla), chickweed (Stellaria media), annual meadow grass (Poa annua), and slender foxtail (Alopecurus myosuroides) are treated at a growth height of 2.5 to 16 cm with 1.5kg per hectare of 2-ethylamino-4-propoxyisopropylamino-6-chloro-s-triazine (I), 1.5kg per hectare of 2-isopropylamino-4-propoxyisopropylamino-6-chloro-s-triazine (II), 1.5kg per hectare of 2-isopropylamino-4-propoxyisopropylamino-6-methoxy-s-triazine (III) and 1.5 kg per hectare of 2,4-bis-(ethoxyisopropylamino)-6-methylmercapto-s-triazine (IV), these amounts of the active ingredients each being dispersed in 500 liters of water. The results of the experiment after three weeks may be seen from the following table:

| | Active ingredient | | | |
|---|---|---|---|---|
| | I | II | III | IV |
| barley | 10 | 0–10 | 0–10 | 0–10 |
| wheat | 0–10 | 0–10 | 0–10 | 0–10 |
| Indian corn | 10 | 0 | 10–20 | 10 |
| small nettle | 90–100 | 90–100 | 90–100 | 90–100 |
| white goosefoot | 90–100 | 90–100 | 90–100 | 90–100 |
| chamomile | 90–100 | 90–100 | 90–100 | 90–100 |
| chickweed | 100 | 90–100 | 90–100 | 90–100 |
| annual meadow grass | 90–100 | 90–100 | 100 | 90–100 |
| slender foxtail | 90–100 | 90–100 | 90–100 | 90–100 |

0 = no damage
100 = total destruction

We claim:

1. A compound of the formula

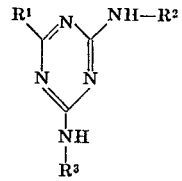

in which $R^1$ denotes a chlorine or bromine atom, $R^2$ denotes a lower alkyl radical or an alkoxyalkyl radical having at most six carbon atoms or a alkylthioalkyl radical having at most 6 carbon atoms, and $R^3$ denotes a lower alkylthioalkyl radical or a α-methylalkyl radical which is substituted by an alkoxy radical, the whole having at most a total of six carbon atoms.

2. 2-chloro-4-ethylamino-6-(α-methyl-β-methoxyethyl)-amino-1,3,5-triazine.

3. 2-chloro-4-isopropylamino-6-(α-methyl-β-methoxyethyl)-amino-1,3,5-triazine.

* * * * *

PO-1050
(5/69)

UNITED STATES PATENT OFFICE
CERTIFICATE OF CORRECTION

Patent No. 3,679,678                    Dated July 25, 1972

Inventor(s) Karl-Heinz Koenig, Artur Maschke, and Adolf Fischer

It is certified that error appears in the above-identified patent and that said Letters Patent are hereby corrected as shown below:

First page, left-hand column, insert
-- [30] Foreign Application Priority Data
    Nov. 28, 1967    Germany.............P 16 70 289.9 --.

Column 5, in the table, under "R²", third formula down, that portion of the formula reading "RH₃" should read -- CH₃ --.

Column 6, line 21, "(Urtica urnes)" should read -- (Urtica urens)

Signed and sealed this 2nd day of January 1973.

(SEAL)
Attest:

EDWARD M. FLETCHER, JR.                    ROBERT GOTTSCHALK
Attesting Officer                            Commissioner of Patents